US006495267B1

(12) United States Patent
Schenkel

(10) Patent No.: US 6,495,267 B1
(45) Date of Patent: Dec. 17, 2002

(54) ANODIZED MAGNESIUM OR MAGNESIUM ALLOY PISTON AND METHOD FOR MANUFACTURING THE SAME

(75) Inventor: Jerry L. Schenkel, Pewaukee, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 0 days.

(21) Appl. No.: 09/970,822

(22) Filed: Oct. 4, 2001

(51) Int. Cl.[7] .............................. B32B 9/00; B21K 1/18

(52) U.S. Cl. .................. 428/469; 29/888.044; 420/402; 420/405; 420/406; 420/407; 420/410; 420/413; 420/414; 428/422; 428/448; 428/471; 428/696

(58) Field of Search ................................ 420/405, 402, 420/406, 407, 410, 413, 414; 428/469, 422, 463, 446, 472, 421, 458, 450, 696, 448, 471; 29/888.044

(56) References Cited

U.S. PATENT DOCUMENTS

| | | | |
|---|---|---|---|
| 1,975,818 | A | 10/1934 | Work |
| 2,582,020 | A | 1/1952 | Emery |
| 2,778,789 | A | 1/1957 | McNeill |
| 2,817,562 | A | 12/1957 | Fleming et al. |
| 3,295,198 | A | 1/1967 | Coan |
| 3,916,784 | A | 11/1975 | Dubuit |
| 4,060,031 | A | 11/1977 | Philipp |
| RE29,739 | E | 8/1978 | Kessler |
| 4,131,982 | A | 1/1979 | Rose et al. |
| 4,149,882 | A | 4/1979 | Unsworth et al. |
| 4,168,161 | A | 9/1979 | Unsworth et al. |
| 4,173,469 | A | 11/1979 | Unsworth et al. |
| 4,321,308 | A | 3/1982 | Jahnke |
| 4,395,442 | A | 7/1983 | Meise et al. |
| 4,401,621 | A | 8/1983 | Unsworth et al. |

(List continued on next page.)

OTHER PUBLICATIONS

Magnesium SA41XA–F, Die Cast; http://www.matweb.com/SpecificMaterial.asp?bassnum=MMAS41&group=General; Jul. 25, 2001, (2 pages).

Magnesium SA41XB–F, Die Cast; http://www.matweb.com/SpecificMaterial.asp?bassmun=MMAS42&group=General; Jul. 25, 2001, (2 pages).

Magnesium AZ91C–T6, Cast; http://www.matweb.com/SpecificMaterial.asp?bassnum=MMAZ90&group=General; Jul. 25, 2001, (2 pages).

Magnesium AZ91C–T4, Cast; http://www.matweb.com/SpecificMaterial.asp?bassnum=MMAZ91&group=General; Jul. 25, 2001, (2 pages).

Magnesium AZ91E–T4, Cast; http://www.matweb.com/SpecificMaterial.asp?bassnum=MMAZ92&group=General; Jul. 25, 2001, (2 pages).

Magnesium AZ91E–T6, http://www.matweb.com/SpecificMaterial.asp?bassnum=MMAZ93&group=General; Jul. 25, 2001, (2 pages).

Magnesium AZ91A–F, Die Cast; http://www.matweb.com/SpecificMaterial.asp?bassnum=MMAZ94&group=General; Jul. 25, 2001, (2 pages).

Magnesium AZ91B–F, Die Cast; http://www.matweb.com/SpecificMaterial.asp?bassnum=MMAAZ95&group=General; Jul. 25, 2001, (2 pages).

(List continued on next page.)

*Primary Examiner*—Robert R. Koehler
(74) *Attorney, Agent, or Firm*—Michael Best & Friedrich LLP

(57) ABSTRACT

An anodized magnesium piston including a head and skirt for an internal combustion engine. The piston includes a non-fiber-reinforced, magnesium-based alloy including up to 2.5 percent by weight rare earth metals. The piston further includes an external surface, at least a portion of which has a base layer of magnesium fluoride, magnesium oxofluoride, magnesium oxide or a mixture thereof electrochemically anodized thereto.

22 Claims, 3 Drawing Sheets

U.S. PATENT DOCUMENTS

| | | | | |
|---|---|---|---|---|
| 4,545,301 | A | 10/1985 | Reinhold | |
| 4,683,821 | A | 8/1987 | Berberich | |
| 4,723,485 | A | 2/1988 | Berberich et al. | |
| 4,798,770 | A | 1/1989 | Donomoto et al. | |
| 4,814,204 | A | 3/1989 | Carey et al. | |
| 4,831,977 | A | 5/1989 | Presswood | |
| 4,832,983 | A | 5/1989 | Nagatomi et al. | |
| 4,871,593 | A | 10/1989 | McIntyre | |
| 4,892,760 | A | 1/1990 | Nishiyama | |
| 4,932,352 | A | 6/1990 | Huvey et al. | |
| 4,976,830 | A | * 12/1990 | Schmeling et al. | 205/321 |
| 4,978,432 | A | 12/1990 | Schmeling et al. | |
| 4,986,231 | A | 1/1991 | Brown | |
| 4,987,014 | A | 1/1991 | Woodword et al. | |
| 4,987,865 | A | 1/1991 | Schenkel | |
| 4,997,024 | A | 3/1991 | Cole et al. | |
| 5,063,894 | A | 11/1991 | Mielke et al. | |
| 5,078,962 | A | 1/1992 | Regazzoni et al. | |
| 5,239,951 | A | 8/1993 | Rao et al. | |
| 5,239,955 | A | 8/1993 | Rao et al. | |
| 5,240,589 | A | 8/1993 | Bartak et al. | |
| 5,264,113 | A | 11/1993 | Bartak et al. | |
| 5,266,142 | A | 11/1993 | Penrice | |
| 5,266,412 | A | 11/1993 | Bartak et al. | |
| 5,313,919 | A | 5/1994 | Rao et al. | |
| 5,385,662 | A | 1/1995 | Kurze et al. | |
| 5,435,872 | A | 7/1995 | Penrice | |
| 5,435,873 | A | 7/1995 | Penrice | |
| 5,470,664 | A | 11/1995 | Bartak et al. | |
| 5,501,748 | A | 3/1996 | Gjestland et al. | |
| 5,616,229 | A | 4/1997 | Samsonov et al. | |
| 5,775,892 | A | 7/1998 | Miyasaka et al. | |
| 5,792,335 | A | 8/1998 | Barton | |
| 5,837,117 | A | 11/1998 | Allegret | |
| 5,934,236 | A | 8/1999 | Rao et al. | |
| 6,167,856 | B1 | 1/2001 | Rao et al. | |
| 6,197,178 | B1 | 3/2001 | Patel et al. | |

OTHER PUBLICATIONS

Magnesium AZ91D–F, Cast; http://www.matweb.com/SpecificMaterial.asp?bassnam=MMAZ96&group=General; Jul. 25, 2001, (2 pages).

Magnesium WE54–T6, Cast; http://www.matweb.com/SpecificMaterial.asp?bassnum=MMWE54&group=General; Jul. 25, 2001, (2 pages).

Magnesium WE 43–T6, Cast; http://www.matweb.com/SpesificMaterial.asp?bassnum=MMWE43&group=General; Jul. 25, 2001, (2 pages).

Hydro Magnesium; Data Sheet Die Cast Magnesium Alloys; Hydro; Nov. 1996, (6 pages).

Elekron; We 43A A corrosion resistant magnesium casting alloy for use up to 570° F; Jul. 1992, (4 pages).

James H. Hawkins; Assessment of Protective Finishing Systems for Magnesium; Presented at the International Magnesium Associations's 50th Annual World Magnesium Conference; May 11–13, 1993; Washington, D.C., pp. 1–13.

Terje Kr. Aune, Thomas J. Ruden; High Temperature Properties of Magnesium Die Casting Alloys; SAE Technical Paper Series 920070; Feb., 24–28, 1992; Detroit, Michigan.

William E. Mercer II; Magnesium Die Cast Alloys for Elevated Temperature Applications; SAE Technacal Paper Series 900788; Feb. 26–Mar. 2, 1990; Detroit, Michigan.

James E. Hillis and Scott O. Shook; Composition and Performance of an Improved Magnesium AS41 Alloy; SAE Technical Paper Series 890205; Feb. 27–Mar. 3, 1989; Detroit, Michigan.

Terje Kr. Aune; Tensile Properties of Die Cast AM50, AM60 and AZ91 from—40° C to +100° C; Hydro Research Center Report; Jun. 5, 1998, pp. 1–14.

Alex J. Zozulin and Duane E. Bartak; A New Inorganic Coating for Magnesium Alloys with Superior Corrosion Resistance, Date Unknown, pp. 1–13.

Thomas J. Pullizzi; Finishing of Magnesium; Early Pretreatment of Magnesium; http://www.finishing.com/fags/magnesium.html; Aug. 30, 2001,(12 pages).

K. Pettersen; Research Centre; pp. 2–21; Nov. 24, 1994.

Elektron, Elektron WE54A Product Specification by Magnesium Elektron Ltd., Date Unknown, (4 pages).

Technology Applications Group Promotional Materials: Tagnite The New Standard in Magnesium Finishing, Date Unknown, (6 pages).

* cited by examiner

ANODIZED MAGNESIUM OR MAGNESIUM ALLOY PISTON AND METHOD FOR MANUFACTURING THE SAME

FIELD OF THE INVENTION

The present invention provides a lightweight anodized magnesium or magnesium-alloy piston, and a method for manufacturing the same.

BACKGROUND OF THE INVENTION

In order for a piston to function properly in an internal combustion engine, the piston must satisfy several requirements. First, the piston must be able to withstand the extreme temperatures (600–650 degrees Fahrenheit) associated with combustion in an engine. More particularly, the piston must be able to substantially maintain its shape after repeated exposure to extreme temperature and pressure. In other words, an ideal piston should exhibit limited “creep” or distortion. Creep is a measure of how much a particular material distorts or moves (i.e. creeps) when exposed to intense heat and pressure, without returning to its original position after the heat and pressure are removed. Other desirable characteristics for a piston include good hardness and wear resistant properties.

In view of this criteria, pistons for internal combustion engines have typically been fabricated from aluminum or aluminum-based alloys. Piston motion causes vibration when the piston reciprocates in an engine, imposing side forces on the crankshaft. These forces are often balanced by expensive counterbalance systems in larger engines. As a result, lighter weight pistons which exhibit less vibration during operation of the engine are continuously being sought.

Attempts have been made to use lighter weight magnesium and magnesium-based alloys pistons. Magnesium pistons have been used in combustion engines with limited success at lower temperatures ranging from 400–500 degrees Fahrenheit; however, magnesium pistons are generally unable to maintain the required properties set forth above when exposed to the elevated temperatures (600–650 degrees Fahrenheit) more typically associated with combustion in an engine. More particularly, the magnesium pistons exhibit creep as the piston tends to shrink away from the cylinder bore over time. More recently, it has been determined that piston wear is also a problem with magnesium and magnesium alloy pistons.

SUMMARY OF THE INVENTION

In one aspect, the invention provides an anodized magnesium piston including a head and skirt for an internal combustion engine. The piston comprises a non-fiber-reinforced, magnesium-based alloy including up to about 4.0 percent by weight rare earth metals. The piston further comprises an external surface, at least a portion of which has a base layer of magnesium fluoride, magnesium oxofluoride, magnesium oxide or a mixture thereof electrochemically anodized thereto, and an internal surface.

In a second aspect, the invention provides a process of manufacturing a magnesium-based alloy piston including a head and a skirt for an internal combustion engine. The method comprises casting a piston using a non-fiber-reinforced, magnesium-based alloy including up to about 4.0 percent by weight rare earth metals. The piston has an internal surface and an external surface. The method further includes immersing the piston into an electrochemical bath containing fluoride ion, providing an electric current to the electrochemical bath, electrochemically anodizing a base layer of magnesium fluoride, magnesium oxofluoride, magnesium oxide or a mixture thereof to at least a portion of the external surface of the piston, and providing a low friction outer surface on the skirt.

In a third aspect, the invention provides a method of improving wear resistance and hardness of a piston for an internal combustion engine. The method comprises casting a non-fiber-reinforced, magnesium-based alloy including up to about 4.0 percent by weight rare earth metals to form a piston having an internal surface and an external surface. The method further comprises immersing the piston in a cooled, temperature controlled electrochemical bath including fluoride ion, providing an electric current to the electrochemical bath and electrochemically anodizing a layer of magnesium fluoride, magnesium oxofluoride, magnesium oxide or a combination thereof to at least a portion of the external surface of the piston. The anodized layer improves the wear resistance and hardness of the piston. In another aspect of the invention, this method further comprises employing the piston in a single-cylinder internal combustion engine in order to improve balancing and reduce vibration in the internal combustion engine when the engine is in use.

Before embodiments of the invention are explained in detail, it is to be understood that the invention is not limited in its application to the details of the compositions and concentrations of components set forth in the following description. The invention is capable of other embodiments and of being practiced or being carried out in various ways. Also, it is understood that the phraseology and terminology used herein is for the purpose of description and should not be regarded as limiting.

DETAILED DESCRIPTION OF THE INVENTION

The invention provides a piston having improved wear resistance, hardness and creep strength characteristics, and methods for manufacturing the same. More particularly, the invention provides a piston made from a magnesium or magnesium-based alloy that is partially, or wholly, electrochemically anodized. The magnesium-based alloy is preferably not reinforced by any fibers, and may include rare earth metals. Generally speaking, the piston is introduced into a cooled, temperature-controlled electrochemical bath in which fluoride ion is present, e.g. a bath containing hydrofluoric acid. The magnesium alloy is then made the anode in an electrolytic cell as a relatively high voltage rectifier supplies a combination AC/DC signal to the electrochemical cell. The anodization or oxidation provides a layer of a mixture of magnesium fluoride, magnesium oxofluoride and magnesium oxide on the submerged portion of the piston. An optional second layer including silicon oxide may be anodized to the base layer.

Figure 2:
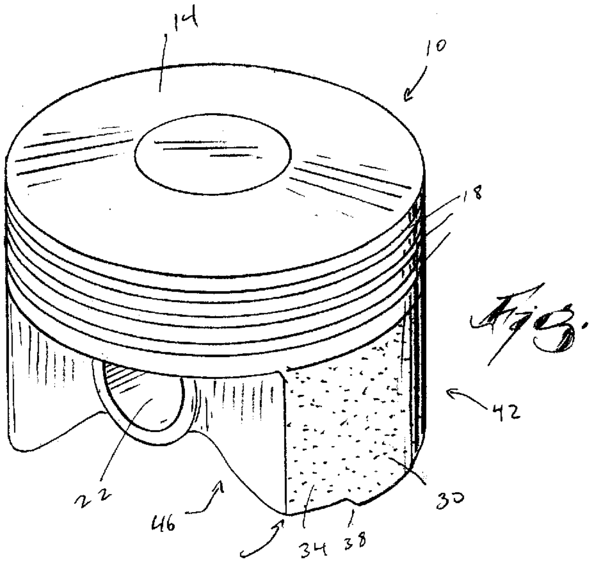
FIG. 2 is a perspective view of an anodized magnesium piston embodying the invention.
Figure 3:
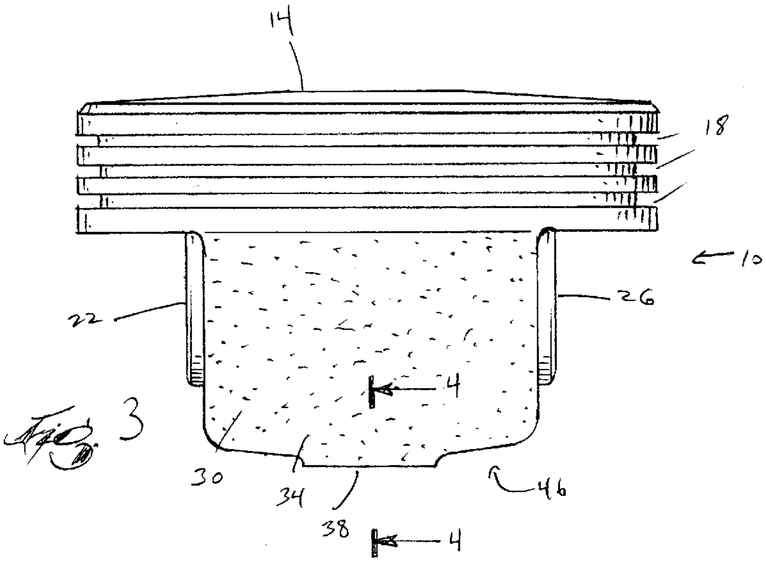
FIG. 3 is a side plan view of the piston of FIG. 2.

A wide variety of magnesium and magnesium-based alloys can be used to fabricate a piston. As shown in FIGS. 2–3, the piston 10 includes a piston head 14, piston lands 18, wrist pin bosses 22, 26 and a skirt 30 having external and inner surfaces 34, 38. More generally, the piston 10 comprises an external surface 42 which includes the piston head 14, the piston lands 18 and the outer surface 34 of the skirt 30 as well as an internal surface 46 (not shown) which includes the inner surface 38 of the skirt 30.

The piston 10 is most preferably fabricated from magnesium-based alloys having up to about 4.0 percent by weight rare earth metals. More particularly, the magnesium-based alloys may include between about 0.01 percent and about 4.0 percent rare earth metals by weight. It is believed that magnesium-based alloys having rare earth metals exhibit improved hardness, wear resistant and creep strength properties in the resulting anodized piston. As used herein, the term "rare earth metals" is meant to include, but not be limited to, ytterbium, erbium, dysprosium and gadolinium.

Below is Table I which shows magnesium alloys that can be used with the anodization process. The table should in no way be construed as limiting.

Another suitable alloy from which the piston can be cast is Elektron® WE43A which is a high strength magnesium-based casting alloy developed in England by Magnesium Elektron Ltd. The chemical composition by weight of this alloy follows:

| | |
|---|---|
| Yttrium | 3.7–4.3 percent |
| Neodymium | 2.0–2.5 percent |
| Rare Earth | 0–1.9 percent |
| Zirconium | 0.4 percent min |
| Magnesium | Base |

The rare earth metals comprise heavy rare earth metals, principally ytterbium, erbium, dysprosium and gadolinium. The heavy rare earth fraction is directly related to the yttrium content of the alloy (i.e. yttrium is present as nominal 80 percent, 20 percent heavy rare earth (HRE) mixture). Having rare earth metals included in the magnesium alloy is believed to work well with the anodization process, further improving the wear characteristics, hardness, and creep strength of the resulting piston.

Other magnesium-based alloys including around 1.0–2.0 percent calcium can also be used. For example, magnesium-based alloy MRI-153 which comprises magnesium and 1–2% calcium is suitable for use with the invention.

Another suitable alloy from which the piston may be cast comprises by weight about 3.6–4.4 percent Al, about 2.0–3.0 percent rare earth metals, a minimum of about 0.1 percent Mn, a maximum of about 0.001 percent Ni, a maximum of

TABLE I

| | PERCENTAGE BY WEIGHT OF COMPONENTS | | | | | | | | | | | | | |
|---|---|---|---|---|---|---|---|---|---|---|---|---|---|---|
| Alloy Name | Mg | Al | R.E. | Si | Mn | Cu | Zn | Ni | Fe | Li | Nd | Y | Zr | Other |
| AM 50A | Base | 4.4–5.4 | | 0.10 Max | 0.26–0.6 | 0.010 Max | 0.22 Max | 0.002 Max | 0.004 Max | | | | | 0.02 Max |
| Mg AE 42 | Base | 3.6–4.4 | 2.0–3.0 | | 0.4 Min. | 0.04 Max | 0.20 Max | 0.001 Max | 0.004 Max | | | | | |
| Mg AS 21 × 1, D.C. | 97 | 1.7 | | 1.1 | 0.1 Min. | | | | | | | | | |
| Mg AS 41 × A–F, D.C. | 94 | 3.5–5 | | 0.5–1.5 | 0.2–0.5 | 0.06 Max | 0.12 Max | 0.03 Max | | | | | | 0.3 Max |
| Mg AS 41 × B–F, D.C. | 94 | 3.5–5 | | 0.5–1.5 | 0.35 Min | 0.02 Max | 0.12 Max | Max | Max | | | | | |
| Mg AZ 91C–T6, C | 90 | 8.1–9.3 | | 0.3 Max | Min | 0.1 Max | 0.4–1 | 0.01 Max | | | | | | 0.3 Max |
| Mg AZ 91C–T4, C | 90 | 8.1–9.3 | | 0.3 Max | Min | 0.1 Max | 0.4–1 | 0.01 Max | | | | | | 0.3 Max |
| Mg AZ 91E–T4, C | 90 | 8.1–9.3 | | 0.2 Max | 0.17 | Max | 0.35–1 | 0.001 Max | Max | | | | | 0.3 Max |
| Mg AZ 91E–T6, C | 90 | 8.1–9.3 | | 0.2 Max | 0.17 | Max | 0.35–1 | 0.001 Max | Max | | | | | 0.3 Max |
| Mg AZ 91A–F, D.C. | 90 | 8.3–9.7 | | 0.5 Max | Min | 0.1 Max | 0.35–1 | 0.03 Max | | | | | | 0.3 Max |
| Mg AZ 91B–F, D.C. | 90 | 8.3–9.7 | | 0.5 Max | 0.13 Min | 0.35 Max | 0.35–1 | 0.03 Max | | | | | | 0.3 Max |
| Mg AZ 91D–F, C | 90 | 8.3–9.7 | | 0.1 Max | 0.13 Min | 0.03 Max | 0.35–1 | 0.002 Max | 0.005 Max | | | | | 0.02 Max |
| Mg WE 54–T6, C | 91 | | | 0.01 Max | 0.15 Max | 0.03 Max | 0.2 Max | Max | | 0.2 Max | 2–4 | 4.7 5 | 0.4–1 | |
| Mg WE 43–T6, C | 92 | | | 0.01 Max | 0.15 Max | 0.03 Max | 0.2 Max | Max | | 0.2 Max | 2.4–4.4 | 3.7–4.3 | 0.4–1 | |

D.C. = Die Cast
C = Cast
RE = Rare Earth Metals about 0.004 percent Fe, and the remainder Mg. The alloy may comprise no Ni as well as no Fe.

Another suitable alloy from which the piston may be cast comprises by weight about 1.0–2.0 percent Al, about 1.0–1.4 percent Si, a minimum of about 0.4 percent Mn and the remainder Mg.

Figure 1:
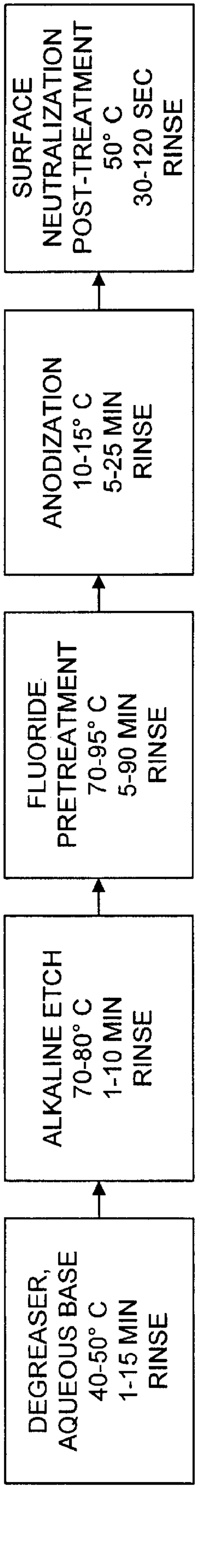
FIG. 1 is a process flow diagram for treating the magnesium-alloy piston.

The above alloys can be used to create a piston by die casting or other similar methods, which can then be anodized using the below methods. The application of the anodized layer is best performed in conjunction with good cleaning practices. Typically, the cleaning procedure shown in the process flow diagram of FIG. 1 is sufficient to degrease and clean the surface. In addition, this method is capable of removing minor corrosion products which may be present on the magnesium alloy pistons through the use of a mild alkaline etch. A preferred alkaline etch lasts for approximately one to ten minutes at 70 to 80 degrees Celsius and is followed by a rinse. This solution, commonly used to brighten die cast alloys, may show insignificant metal loss after a ten-minute treatment. The degreasing and alkaline etch steps are optional pre-anodization steps.

An untreated magnesium piston or a cleaned magnesium piston is then treated in a first electrochemical bath. Typically, the piston is spring loaded into the electrochemical bath. The spring holds the piston in the bath while anodization takes place, and provides good electrical contact. This first electrochemical bath cleans and forms a layer comprising magnesium oxide, magnesium fluoride, magnesium oxofluoride, or a mixture thereof on the piston. The first electrochemical bath comprises an aqueous electrolytic solution comprising a soluble hydroxide or mild acid compound and a soluble fluoride. Examples of suitable hydroxides for use in the invention include alkali metal hydroxides, ammonium hydroxide and potassium hydroxide. The source of the soluble fluoride may include ammonium fluoride, ammonium bifluoride, an alkali metal fluoride, and hydrogen fluoride. During anodization of the piston, it may be necessary to add more fluoride solution to maintain the acidity of the solution.

In the first electrochemical bath, the piston acts as the anode. Generally, the vessel holding the electrochemical bath is used as a cathode, however, a separate cathode may be immersed into the bath. The anode may be connected through a switch to a rectifier while the vessel may be directly connected to the rectifier. The rectifier supplies a DC signal to the electrochemical cell. The rectifier and switch may be placed in communication with a microprocessor control for purposes of controlling the electrochemical composition.

The microprocessor may control a switch which provides a continuous or pulsed DC signal. Preferably, the DC signal is pulse or pulse modulated with a linear increase in average voltage until the desired current density is achieved. Typically, the piston is subjected to the DC current for approximately five to 25 minutes. Variations in length of exposure to the current and variations between pulse and continuous current can affect the ultimate hardness and thickness of the layer being applied to the piston. Preferably, the current is pulsed as this provides a more consistent anodized surface at a constant temperature. Generally, relatively high voltages in excess of 150 volts are used, while 150–300 volts is preferred.

The conditions used in the electrochemical deposition process are preferably those illustrated below:

TABLE II

| Component | Preferred | More Preferred | Most Preferred |
|---|---|---|---|
| pH | ≧11 | 12 to 13 | 12.5 to 13 |
| Temp. (degrees C.) | 5 to 30 | 10 to 25 | 15 to 20 |
| Time (minutes) | up to 8 | 2 to 6 | 2 to 3 |
| (mA/cm$^2$) | 10 to 200 | 20 to 100 | 40 to 60 |

The magnesium-based piston is maintained in the first electrochemical bath for a time sufficient to clean impurities at the surface of the piston and to form the base layer thereon. This coats the magnesium piston with the first or base layer, comprising magnesium oxide, magnesium fluoride, magnesium oxofluoride, or a mixture thereof. Too limited exposure of the piston to the bath may result in insufficient formation of the first layer and/or insufficient cleaning of the magnesium piston. Over exposure to the electrochemical bath may be uneconomical as the process time is increased and the first layer will become thicker than necessary and may prove even to be non-uniform. This base layer is generally uniform in composition and thickness across the surface of the piston and provides an excellent base upon which a second, optional, inorganic layer (described below) may be deposited. Generally, the thickness of the first layer is about 5–25 microns, and more preferably about 7.5–12 microns in thickness.

Exposure to the first electrochemical bath appears to clean or oxidize the surface of the magnesium piston, while also providing the base layer. The base layer is compatible with a composition which may form the optional second layer and provides a good substrate for the adhesion of the optional second layer. The compatibility of these compounds with those of the optional second layer appear to permit the deposition of a layer comprising silicon oxide, in a uniform manner, without appreciable etching of the metal substrate. In addition, both the first and second layers may comprise oxides of other metals within the alloy and oxides of the cations present in the electrolytic solution.

The silicon oxide may be applied to the magnesium piston by adding a silicate to the first electrochemical bath, or by immersing the anodized magnesium piston in a second electrochemical bath as described hereafter.

When using a second electrochemical bath, the pretreated piston is preferably thoroughly washed with water to remove any contaminants after exposure to the first electrochemical bath before being immersed into the second electrochemical bath. The second electrochemical bath comprises an aqueous electrolytic solution comprising about 2 to 15 g/L of a soluble hydroxide or mild acid compound, about 2 to 14 g/L of a soluble fluoride containing compounds selected from the group consisting of fluorides and fluorosilicates and about 5 to 40 g/L of a silicate. Preferred hydroxides include alkali metal hydroxides and ammonium hydroxide. More preferably, the hydroxide is an alkali metal hydroxide, and most preferably, the hydroxide is potassium hydroxide.

Alkali metal fluorides, hydrogen fluoride, ammonium bifluoride or ammonium fluoride, or a fluorosilicate such as an alkali metal fluorosilicate or mixtures thereof may all act as the fluoride containing compound. Preferably, the fluoride source comprises an alkali metal fluoride, an alkali metal fluorosilicate, hydrogen fluoride or mixtures thereof. Most preferably, the fluoride source comprises an alkali metal fluoride. The most preferable source is potassium fluoride.

Again, a silicate can either be added to the first elecrochemical bath or to the second electrochemical bath above.

"Silicate" is meant to refer to alkali metal silicates, alkali metal fluorosilicates, silicate equivalents or substitutes such as colloidal silicas, and mixtures thereof. More preferably, the silicate comprises an alkali metal silicate, and most preferably, the silicate is potassium silicate.

Fluorosilicate may provide both the fluoride and the silicate in the aqueous solution. Therefore, to provide a sufficient concentration of fluoride in the bath only about 2 to 14 g/L of a fluorosilicate may be used. On the other hand, to provide a sufficient concentration of silicate, about 5 to 40 g/L of the fluorosilicate may be used. Of course, the fluorosilicate may be used in conjunction with other fluoride and silicate sources to provide the necessary solution concentrations. Further, it is understood that, in an aqueous solution at a pH of at least about 11, the fluorosilicate will hydrolyze to provide fluoride ion and silicate in the aqueous solution.

Compositional ranges for the aqueous electrolytic solution are shown in the below Table.

TABLE III

| Component | Preferred | More Preferred | Most Preferred |
|---|---|---|---|
| Hydroxide (g/L) | 2 to 15 | 4 to 9 | 5 to 6 |
| Fluoride Source (g/L) | 2 to 14 | 6 to 12 | 7 to 9 |
| Silicate (g/L) | 5 to 40 | 10 to 25 | 15 to 20 |

The conditions of the electrochemical deposition process are preferably as illustrated below.

TABLE IV

| Component | Preferred | More Preferred | Most Preferred |
|---|---|---|---|
| PH | ≧11 | 11.5 to 13 | 12 to 13 |
| Temp. (degrees Celsius) | 5 to 35 | 10 to 30 | 15 to 25 |
| Time (minutes) | 5 to 90 | 10 to 40 | 15 to 30 |
| Current Density (mA/cm$^2$) | 5 to 100 | 5 to 60 | 5 to 30 |

These reaction conditions allow the formation of an inorganic coating of up to about 40 microns in about 90 minutes or less. Maintaining the voltage differential for longer periods of time will allow for the deposition of thicker coatings. However, for most practical purposes, coatings of about 10 to 30 microns in thickness are preferred and can be obtained through a coating time of about 5 to 20 minutes.

As a result of the relatively high voltages, greater than 150 volts, a spark process develops during the deposition. The sparking action is the result of the applied voltage being greater than the dielectric breakdown voltage of the layer produced in the first chemical step and the developing coating in the electrolytic step and produces temperatures which have been estimated to be greater that 1000 degrees Celsius. These localized high temperatures result in the fusion of silicate and oxide species into the magnesium piston.

After the layer comprising the mixture of magnesium fluoride, magnesium oxofluoride and magnesium oxide (as well as the optional silicate layer) has been applied to at least part of the external surface of the magnesium piston 10, a low friction surface is provided on the outer surface 34 of the skirt 30. Unless a low friction surface is provided, the anodized portion of the outer skirt 34 is likely to abrade or even score the cast iron bore which houses the piston 10.

A variety of methods can be used to provide the low friction surface and decrease the roughness of the anodized outer surface 34 of the skirt 30. While it is desirable to provide a low friction surface on the outer skirt in order to prevent friction and resulting abrasion, it is not necessary to provide the lands between the piston rings with a low friction surface as the diameter of the rings is typically greater than that of the skirt, i.e. the lands do not contact the bore.

Figure 4:
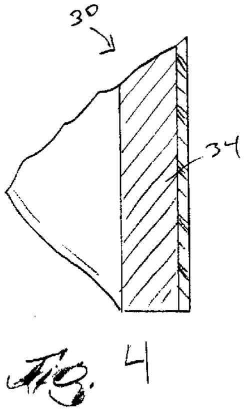
FIG. 4 is a cross-sectional view taken along line 4—4 in FIG. 3.

The most preferred method of providing the outer surface 34 of the skirt 30 with a low friction surface is by machining, sanding or polishing the surface 34. In other words, these methods which are known in the art can be used to reduce and remove the peaks created on the outer skirt by the anodizing process without removing the anodized layer. FIG. 4 depicts one embodiment of the piston wherein the anodized surface of the skirt has been machined, sanded or polished.

Figure 5:
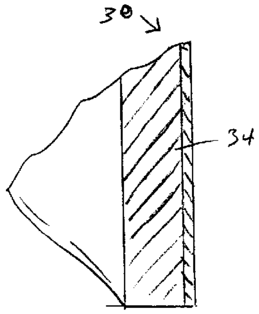
FIG. 5 is a cross-sectional view taken along line 4—4 in FIG. 3 of an alternative embodiment of the piston.
Figure 6:
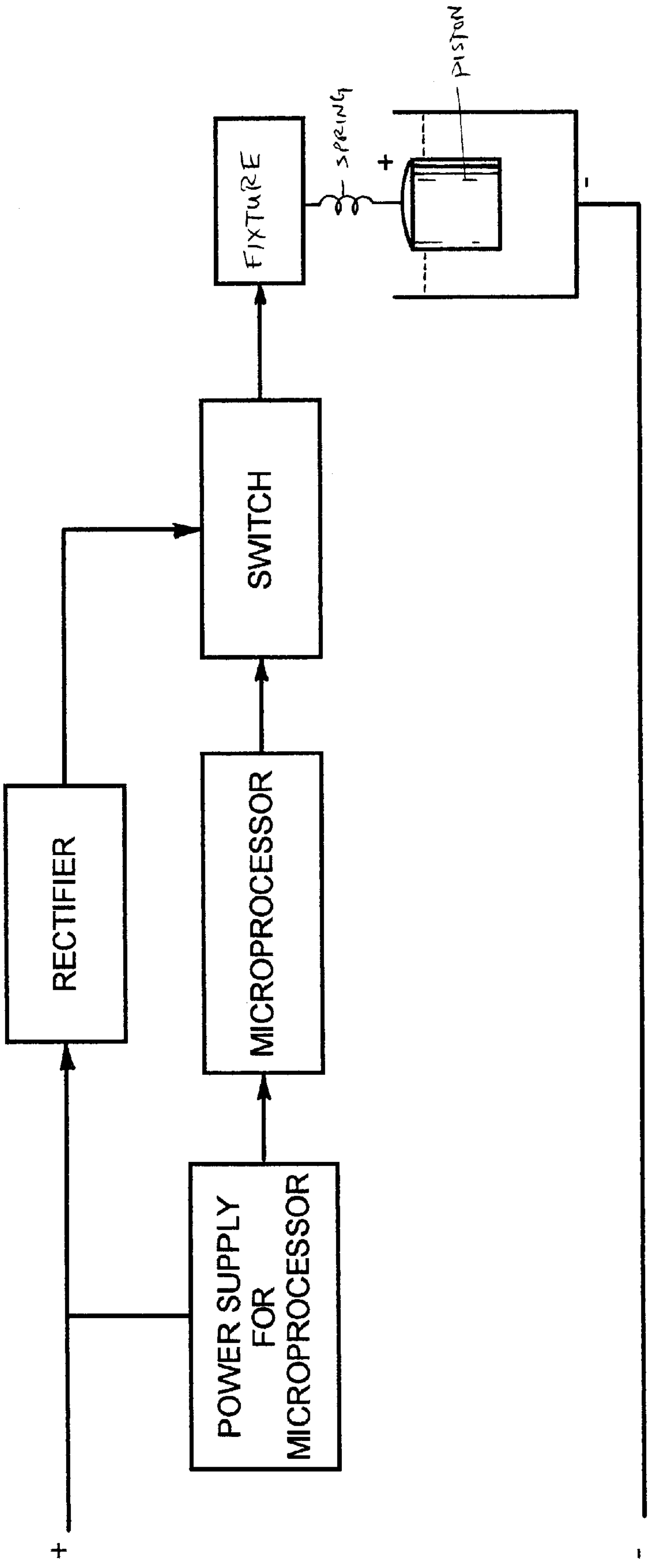
FIG. 6 is a schematic diagram of the electrochemical bath set up.

Alternatively, TEFLON® (polytetrafluoroethylene), manufactured by DuPont can be applied to the outer surface 34 of the skirt 30 using a silk screen or pad printing process, both of which are well-known in the art. Preferably, TEFLON® is applied using a petroleum-based liquid solvent, such as cyclohexanol. Subsequently, TEFLON® is baked or cured onto the surface at a temperature of 400 degrees Fahrenheit for approximately 15–30 minutes to allow the TEFLON® to attach to the anodized magnesium substrate. FIG. 5 depicts an embodiment of the piston wherein the outer surface of the skirt has a layer of polytetrafluoroethylene.

Another example of a suitable substance which can be applied to provide a low friction surface is EMRALON®, which is a registered trademark of the Acheson Colloids Company, Port Huron, Mich. EMRALON® is a non-sticking fluorocarbon coating to which very few solid or liquid substances will permanently adhere. The coefficient of friction for EMRALON® is generally in the range of 0.05 to 0.20. It has excellent heat resistance and cryogenic stability with a temperature range from 450 degrees Fahrenheit to as high as 500 degrees Fahrenheit continually and 600 degrees Fahrenheit intermittently. The chemical resistance of EMRALON® makes it normally impervious to chemical environments.

A wetted, resin-bonded dry-film lubricant such as a fluoropolymer or graphite can also be applied to the piston, wherein the coating thickness is adjustable to achieve consistent diameter pistons. Such a coating and related methods are disclosed in U.S. Pat. No. 5,435,872 issued to Penrice, which is hereby fully incorporated by reference. Similarly, the friction and roughness of the surface can be reduced by combining a saw tooth surface finish and a coating of fluorocarbon polymers as disclosed in U.S. Pat. No. 4,987,865 issued to Schenkel, which is hereby fully incorporated by reference.

Moreover, a composition comprising at least one ester of a carboxylic acid, with a carboxylic acid or derivative thereof, a phosphorus acid salt and an antioxidant can be used to provide a smooth external skirt surface.

In addition, the surface can be coated with an epoxy-resin in which is mixed a ceramic oxide material. The piston is then coated in a drier oven and heater and cured for at least one hour at a temperature of approximately 220 degrees Celsius. U.S. Pat. No. 4,398,442 discloses such coatings and methods and is hereby fully incorporated by reference.

Also, a composition comprising molybdenum disulfide (e.g. Dow Chemical's D-10) can also be used as an alternative for providing a low friction surface on the outer skirt. Application of DuPont's 957-303 may also provide a similar low friction surface.

Overall, fabricating anodized-magnesium pistons in the above-described manner provides a number of benefits over conventional aluminum-based pistons. First, the present invention provides a piston that can actually be fabricated from a magnesium or magnesium-based alloy instead of an aluminum or aluminum-based alloy. As discussed in the Background of the Invention section, other magnesium and magnesium-based alloys have failed at high temperatures. The anodized magnesium-based piston is approximately 40 percent lighter than its aluminum-based counterpart. Consequently, the anodized magnesium piston also tends to vibrate less than an aluminum piston when reciprocating in an internal combustion engine, and more particularly, a single-cylinder engine. As a result, this simplifies and even eliminates the need for counter-balancing in the engine. This in turn results in cost savings in the production and manufacture of the internal combustion engine.

Moreover, the anodized-magnesium piston better withstands "creep" as defined in the Background of the Invention. In other words, the anodized magnesium piston is able to withstand the temperatures (600–650 degrees Fahrenheit) associated within an internal combustion engine. Again, when a piston is subjected to a given load and temperature over time, it may experience "plastic deformation." In other words, the piston may lose its original shape if operating conditions are excessive. In an internal combustion engine, a push force is created as the piston rings try to push gases down. The pressure within the bore pushes the piston rings downward in the grooves and enlarges the grooves. Eventually, poor creep strength of a piston in an internal combustion engine has a significant impact on emissions and the efficiency of engine performance. Anodizing the magnesium-based alloy tends to prevent creep as the piston tends to maintain its shape when exposed to harsh combustion conditions. Ideally, no more than 0.1–0.2 percent of the approximately 3.5 inch diameter of the piston creeps. Anodizing a magnesium piston achieves this goal, while also reducing the amount of expensive rare earth materials that need to be included in the magnesium alloy.

Also, anodizing the magnesium piston in the manner set forth above significantly improves the wear resistance and the hardness of the piston. Generally, the magnesium piston is able to withstand 800 hours in an engine without showing wearing.

Finally, the anodizing process yields a coating having consistent thickness which is crucial for optimum performance of the piston and the associated internal combustion engine. Using the above methods, the coating has a consistency of about plus or minus 10 percent of the actual thickness of the coating. More importantly, the anodization provides consistency in the layer covering the rings and the skirt.

What is claimed is:

1. An anodized magnesium piston including a head and skirt for an internal combustion engine, the piston comprising:

a non-fiber-reinforced, magnesium-based alloy including about 0.01 to about 4.0 percent by weight rare earth metals;

an external surface, at least a portion of which has a base layer of magnesium fluoride, magnesium oxofluoride, magnesium oxide or a mixture thereof electrochemically anodized thereto; and an internal surface.

2. The piston of claim 1, further comprising an inorganic layer including silicon anodized to the base layer.

3. The piston of claim 1, wherein the entire piston has the base layer electrochemically anodized thereto.

4. The piston of claim 3, wherein the skirt has a low friction outer surface.

5. The piston of claim 4, wherein the low friction outer surface of the skirt is at least one of machined, sanded and polished.

6. The piston of claim 4, wherein the low friction outer surface of the skirt has a layer of polytetrafluoroethylene.

7. The piston of claim 1, wherein the magnesium-based alloy comprises by weight about 3.6–4.4 percent Al, about 2.0–3.0 percent rare earth metals, a minimum of about 0.1 percent Mn, a maximum of about 0.001 percent Ni, a maximum of about 0.004 percent Fe, and the remainder Mg.

8. The piston of claim 1, wherein the magnesium-based alloy comprises by weight about 1.0–2.0 percent Al, about 1.0–1.4 percent Si, a minimum of about 0.4 percent Mn and the remainder Mg.

9. The piston of claim 1, wherein the magnesium-based alloy comprises by weight about 3.7–4.3 percent Y, about 2.0–2.5 percent Nd, a minimum of about 0.4 percent Zr and the remainder Mg.

10. An anodized magnesium piston including a head and skirt for an internal combustion engine, the piston comprising:

a non-fiber-reinforced, magnesium-based alloy including up to about 4.0 percent by weight rare earth metals;

an external surface, at least a portion of which has a base layer of magnesium fluoride, magnesium oxofluoride, magnesium oxide or a mixture thereof electrochemically anodized thereto; and an internal surface, wherein the skirt has a low friction outer surface that is at least one of machined, sanded and polished.

11. The piston of claim 10, further comprising an inorganic layer including silicon anodized to the base layer.

12. The piston of claim 10, wherein the entire piston has the base layer electrochemically anodized thereto.

13. The piston of claim 10, wherein the low friction outer surface of the skirt has a layer of polytetrafluoroethylene.

14. The piston of claim 10, wherein the magnesium-based alloy comprises by weight about 3.6–4.4 percent Al, about 2.0–3.0 percent rare earth metals, a minimum of about 0.1 percent Mn, a maximum of about 0.001 percent Ni, a maximum of about 0.004 percent Fe, and the remainder Mg.

15. The piston of claim 10, wherein the magnesium-based alloy comprises by weight about 1.0–2.0 percent Al, about 1.0–1.4 percent Si, a minimum of about 0.4 percent Mn and the remainder Mg.

16. The piston of claim 10, wherein the magnesium-based alloy comprises by weight about 3.7–4.3 percent Y, about 2.0–2.5 percent Nd, a minimum of about 0.4 percent Zr and the remainder Mg.

17. An anodized magnesium piston including a head and skirt for an internal combustion engine, the piston comprising:

a non-fiber-reinforced, magnesium-based alloy comprising by weight about 3.6–4.4 percent Al, about 2.0–3.0 percent rare earth metals, a minimum of about 0.1 percent Mn, a maximum of about 0.001 percent Ni; a maximum of about 0.004 percent Fe, and the remainder Mg;

an external surface, at least a portion of which has a base layer of magnesium fluoride, magnesium oxofluoride, magnesium oxide or a mixture thereof electrochemically anodized thereto; and an internal surface.

18. The piston of claim 17, further comprising an inorganic layer including silicon anodized to the base layer.

19. The piston of claim 17, wherein the skirt wherein the skirt has a low friction outer surface.

20. The piston of claim 17, wherein the low friction outer surface is at least one of machined, sanded and polished.

21. The piston of claim 17, wherein the low friction outer surface of the skirt has a layer of polytetrafluoroethylene.

22. The piston of claim 17, wherein the entire piston has the base layer electrochemically anodized thereto.

* * * * *